Patented Oct. 26, 1943

2,332,548

UNITED STATES PATENT OFFICE 2,332,548

RIBOFLAVIN PREPARATION AND PROCESS OF MAKING SAME

Morris Eli Auerbach, Albany, N. Y., assignor to Winthrop Chemical Company, Inc., New York, N. Y., a corporation of New York No Drawing. Application April 15, 1941, Serial No. 388,643

9 Claims. (Cl. 260—211)

The present invention pertains to the preparation of soluble riboflavin preparations.

The great insolubility of riboflavin in acceptable solvents has heretofore definitely limited or rendered the administration of more than a very small quantity of the vitamin extremely inconvenient.

Such preparations as are now available for medical use permit the administration of not more than one half milligram of vitamin per cc. of fluid injected. Some of these preparations depend upon the tendency of riboflavin to form supersaturated solutions. These solutions are open to the serious objection that they are stable only for very short periods of time.

A simple soluble derivative of riboflavin can be prepared by dissolving riboflavin in a minimum amount of sodium hydroxide solution. However, the resulting solution of the sodium salt of riboflavin is of limited desirability because of its relatively high alkalinity (in the neighborhood of pH 10.5). Buffering of such solutions to pH 7.4 (the normal pH of the blood) causes immediate precipitation of riboflavin crystals. Moreover, exposure of these solutions to carbon dioxide likewise results in precipitation of riboflavin crystals.

It is an object of the present invention to provide riboflavin preparations which are not open to the foregoing objections.

It is an object of this invention to provide riboflavin preparations which will make possible the administration of large therapeutic doses of the vitamin at a lower pH value than is possible when using the simple sodium salt; to provide solutions of riboflavin which will neither precipitate out at pH 7.4, the normal pH of the blood, nor be precipitated upon exposure to carbon dioxide.

These and other objects will be seen from the detailed description which follows.

I have found that the foregoing objects can be accomplished by forming a double salt of sodium riboflavin and sodium tetraborate. This double salt is sufficiently soluble in distilled water at room temperature (20° C.) to permit the preparation of solutions containing as much as 40 mgm. to 50 mgm. riboflavin per cc. The pH of these aqueous solutions lies between pH 9.2 and pH 9.5, and solutions so formed remain clear when buffered to the normal pH of blood.

Similarly a double salt can be formed containing sodium riboflavin and sodium metaborate. This salt is sufficiently soluble in distilled water at 20° C. to permit the preparation of solutions containing as much as 90–100 mg. riboflavin per cc. The pH of these aqueous solutions lies between 10.3–10.5 and they are, therefore, somewhat less desirable than solutions containing the tetraborate double salt.

Potassium salts corresponding to either of the foregoing sodium salts can be prepared in an analogous manner.

These double salts can be prepared in several ways. They can be isolated as dry powders which can then be used as components of therapeutic mixtures. They can be formed in aqueous solution by reacting riboflavin with proper quantities of sodium or potassium hydroxide and boric acid and evaporating the resulting mixture to dryness. They can also be formed in solutions also containing other therapeutic factors or other vitamins, for example, those of the vitamin B group, and the resulting mixture evaporated to dryness.

Dry, intimate mixtures of riboflavin and sodium or potassium borates can also be prepared, these mixtures being soluble in hot water, and remaining in solution even after the solution has been cooled. The pH of the resulting injection solution can be varied from pH 7 to pH 9 according to the relative quantity of borates used. These dry intimate mixtures can be prepared so as to also contain other therapeutic factors, or other vitamins, for example, those of the vitamin B group.

The following examples serve to illustrate my invention, but they are not intended to limit it thereto:

Example 1

3.76 gm. (1/100 mole) riboflavin are dissolved in 30 cc. of water containing 0.4 gm. (1/100 mole) sodium hydroxide and 3.81 gm. (1/100 mole) sodium borate U. S. P. The solution so obtained is added, with adequate stirring, to 400 cc. acetone. The double salt is thereby precipitated and can be filtered off and dried, and is then ready for use.

Instead of acetone for the precipitation of the double salt other water-miscible organic solvents can be used, either alone or mixed as for instance ethyl alcohol, isopropyl alcohol, n-propyl alcohol, or dioxane.

According to my analytical findings, this product has the following chemical composition: $C_{17}H_{19}O_6N_4Na.Na_2B_4O_7.10H_2O$. It can be recrystallized from a mixed solvent containing water, acetone and alcohol without altering its composition.

Example 2

3.76 gm. (1/100 mole) riboflavin are dissolved in 30 cc. water containing .56 gm. (1/100 mole) potassium hydroxide and 3.23 gm. (1/100 mole) potassium borate penta hydrate. The solution so obtained is added, with adequate stirring, to 400 cc. acetone. The double salt is thereby precipitated and can be filtered off and dried and is then ready for use. It has a chemical composition similar to that described in Example 1.

*Example 3*

3.76 gm. (1/100 mole) riboflavin are dissolved in 30 cc. of water containing .4 gm. (1/100 mole) sodium hydroxide and 1.23 gm. (1/50 mole) sodium metaborate. The solution so obtained is added to a mixture of 200 cc. 95% ethanol and 200 cc. acetone. The double salt is thereby precipitated and can be filtered off and dried, and is then ready for use. This product has the following chemical composition: $C_{17}H_{19}O_6N_4Na.Na_2B_2O_4.10H_2O$.

*Example 4*

1.5 grams of riboflavin are dissolved in 145 cc. of 0.1N NaOH. At the same time 6 grams of boric acid are dissolved in 200 cc. of water. The two solutions are mixed and any desired aliquots of the resulting mixture are brought to dryness, using suitable precautions to prevent decomposition. For example, aliquots of this mixture can be frozen and evaporated in vacuo in a frozen state. This process also can be carried out in ampules which afterwards are sealed, either under atmospheric pressure or in vacuo. The preparation of such a dry powder can also be carried out under sterile conditions.

The riboflavin in this dry preparation is present in the same chemical form as described in Example 1.

If an aliquot of the dry preparation containing the equivalent of 5 mg. riboflavin is placed in 2 cc. of water at room temperature, a clear solution results, with a pH of about 7.4–7.6. The solution remains clear for at least 24 hours.

The advantages of the double compounds prepared in accordance with this invention are demonstrated by the following tests:

A 5% solution of the sodium salt of riboflavin has a pH of about 10.5 and is quite unstable if the pH drops slightly. On addition of such a solution to a phosphate buffer solution, pH 7.4 (approximately that of blood), an instantaneous precipitation of riboflavin occurs. This reaction would cause a flocculation if intravenous injections were made rapidly, but would be of little significance if made slowly.

On injection of a 1% aqueous solution of the sodium salt of riboflavin subcutaneously, marked induration and deposition is demonstrable after 24 hours. The local reaction at the 72nd hour is slight and complete absorption has occurred. Reactions are noticeable 24 hours after intramuscular injections but are only slight and absorption is complete.

The double compound produced in accordance with this example when used in a concentration of 1% (riboflavin) produces no local reactions which are demonstrable 24 hours after either subcutaneous or intramuscular injections. Adsorption is rapid and no deposition occurs. The composition of this product is adjusted so that a solution prepared with water has a pH of 7.4–7.6. It does not precipitate on injection into the blood stream or into a buffer solution, pH 7.4.

*Example 5*

300 mgm. riboflavin are dissolved in 29 cc. 0.2N NaOH. At the same time, 600 mgm. thiamin chloride, 300 mgm. vitamin B6, 3 grams nicotinic acid amide, 300 mgm. calcium pantothenate and 1.2 grams boric acid are dissolved in 40 cc. water. The two solutions are mixed, and any desired aliquots of the resulting mixture are brought to dryness, using suitable precautions to prevent decomposition. For example, aliquots of this mixture can be frozen and evaporated in vacuo in a frozen state. This process also can be carried out in ampules which afterwards are sealed, either under atmospheric pressure or in vacuo. All operations can be carried out under sterile conditions.

If an aliquot of the dried preparation containing the equivalent of 5 mg. riboflavin, as well as corresponding quantities of the other ingredients, is placed in 2 cc. of water at room temperature, a clear solution results with pH of about 7.3. The riboflavin in this dry preparation is present in the same chemical form as described in Example 1. The solution remains clear for at least 24 hours.

*Example 6*

5 mg. riboflavin are mixed with 5 mg. sodium borate and optionally, 20 mg. of an inert filler, such as milk sugar. This mixture may be dispensed either as a powder or in tablet form. When a portion of the mixture containing the amounts given is brought to a boil with 2 cc. of water, a clear solution results with pH of about 8.5. This solution remains clear for at least 24 hours.

*Example 7*

15 mg. sodium borate are mixed with 5 mg. riboflavin, 10 mg. thiamin chloride, 5 mg. vitamin B6, 5 mg. calcium pantothenate and 30 mg. sodium nicotinate and optionally, 20 mg. of an inert filler such as milk sugar. This mixture may be dispensed either as a powder or in tablet form. When a portion of the mixture containing the amounts given is brought to a boil with 2 cc. of water, a clear solution results, with pH of about 7.6.

I claim:

1. The process which comprises dissolving riboflavin in an aqueous solution of sodium hydroxide and sodium borate, stirring the resultant solution into a non-solvent for the riboflavin compound formed and filtering off the precipitated riboflavin compound.

2. The double salt of sodium tetraborate and sodium salt of riboflavin, said double salt having the empirical formula

3. The process for making a riboflavin composition in which the aqueous solubility of the riboflavin materially exceeds 12 mg. per 100 cc. of water at room temperature, which comprises intermixing riboflavin, an alkali and a water-soluble borate in proportions such that the riboflavin content of the composition is at least 0.02%, the amount of the water-soluble borate used corresponding to at least 1 gram-atom of boron per gram-mole of riboflavin, and the amount of alkali used being sufficient so that the pH of the composition, in aqueous media, lies in the range from substantial neutrality to pH approximately 10.

4. The process for preparing a double salt of sodium tetraborate and the sodium salt of riboflavin, said double salt having the formula:

which comprises incorporating the stoichiometric amounts of riboflavin, sodium hydroxide and boric acid in an aqueous medium, and isolating the double salt.

5. The process for preparing a double salt of an alkali metal borate and an alkali metal salt of riboflavin, which comprises incorporating the alkali metal borate and the alkali metal salt of riboflavin in an aqueous medium.

6. A riboflavin composition in which the aqueous solubility of the riboflavin materially exceeds 12 mg. per 100 cc. water at room temperature, said composition comprising at least 0.02% of an alkali salt of riboflavin, and a member of the class consisting of boric acid and alkali metal borates in amount corresponding to at least 1 gram-atom of boron per gram-mole of riboflavin, said composition being further characterized by having, in aqueous media, a pH in the range from substantial neutrality to pH approximately 10.

7. A riboflavin solution in which the aqueous solubility of the riboflavin materially exceeds 12 mg. per 100 cc. of water at room temperature, comprising an aqueous diluent, at least 0.02% riboflavin, a member of the class consisting of boric acid and alkali metal borates in amount corresponding to at least one gram-atom of boron per gram-mole of riboflavin, and a buffer in amount sufficient to render the composition substantially neutral.

8. A double salt of an alkali metal borate and an alkali metal salt of riboflavin.

9. A process which comprises reacting riboflavin with an alkali metal hydroxide and an alkali metal borate in aqueous solution, introducing the reaction mass into a non-solvent for the riboflavin compound formed, and separating precipitated riboflavin compound and liquid.

MORRIS E. AUERBACH.